United States Patent [19]

Picandet

[11] 3,908,089

[45] Sept. 23, 1975

[54] CIRCUIT FOR ADDING A PARTY TO A CONFERENCE IN A PCM EXCHANGE

[75] Inventor: Jean A. Picandet, Paris, France

[73] Assignee: Jeumont-Schneider, Puteaux, France

[22] Filed: July 9, 1974

[21] Appl. No.: 486,815

[30] Foreign Application Priority Data

July 12, 1973 France .............................. 73.25580

[52] U.S. Cl. .............................................. 179/18 BC

[51] Int. Cl.² .............................................. H04M 3/56

[58] Field of Search .................................. 179/18 BC

[56] References Cited

UNITED STATES PATENTS

| | | | |
|---|---|---|---|
| 3,420,959 | 1/1969 | Hall | 179/18 BC |
| 3,699,264 | 10/1972 | Pitroda | 179/18 BC |

*Primary Examiner*—William C. Cooper
*Attorney, Agent, or Firm*—David A. Blumenthal; Arthur Schwartz; Bacon & Thomas

[57] ABSTRACT

A conference circuit for connecting a party to an existing multiple party connection in an automatic multiplex PCM exchange. Conferenced party signals are provided over a separate outgoing exchange line which is routed to an expander circuit for addition to the existing connection in the same multiplex time slot.

8 Claims, 2 Drawing Figures

CIRCUIT FOR ADDING A PARTY TO A CONFERENCE IN A PCM EXCHANGE

BACKGROUND OF THE INVENTION

1. Field of the Invention

The invention relates to a process for routing or trunking between a number of correspondents in an automatic electronic multiplex pulse code modulation (PCM) exchange, and to a corresponding conference circuit.

2. Description of the Prior Art

An automatic electronic exchange of this kind usually has the following items in its transmission channel: a modulator-sampler, an analog-to-digital converter, a compressor, a connection network, an expander, a digital-to-analog converter and a demodulator.

To set up a conference between a number of correspondents, and, assuming that two correspondents are already communicating with one another, the prior art comprises adding for each direction of communication the digital codes for the communicating correspondents to the digital codes for other correspondents in the actual connection network. A disadvantage of such a technique is that its complexity and cost increase in proportion as the number of persons taking part in the conference increases.

According to this invention, the various digital codes are added together not in the connection network but at the expander outputs, thus providing a considerable simplification, more particularly in the case of a low-capacity exchange.

SUMMARY OF THE INVENTION

In the invention, the exchange connection network has added to it as many extra multiplex PCM outgoing lines as there are other or additional correspondents to be placed in conference with the first two correspondents already in communication, and the digital codes for the speech of one of such other correspondents is passed through each such supplementary line. Through the agency of logic selector circuits, the digital codes for each extra outgoing line are routed towards as many outlets as there are outgoing PCM multiplex lines to be conferenced. The code is converted by means of expanders into a digital code which has a linear pattern, and by means of a set of adders, the digital codes at the output by the expanders are added to the digital code at the output by the expander for the outgoing multiplex PCM line of the first two communicating correspondents. The adder output is fed to the digital-to-analog converter allotted to the last-mentioned two correspondents.

The conference circuit thus comprises as many additional outgoing PCM multiplex lines in the exchange switching network as there are additional parties to be conferenced with the existing multiple party connection. Each such additional line extends to a logic selector circuit adapted to route the digital codes from such line to an output defined on the basis of an address code supplied to the logic selector circuit. Each such output is connected to the input of an expander circuit. For each logic selector circuit, a circulating store is provided for supplying the address code and consists of as many shift registers as there are binary elements in the address supplied to the logic selector circuit. Each register has as many positions as there are time slots in the PCM multiplex. The registers receive shift pulses from the exchange clock means or time base, and each store is filled by the exchange control logic which is synchronized by such time base.

The numerical codes output by the expanders for the extra outgoing lines are added to the digital code output by the expander of the outgoing line of the first existing communicating correspondents. The adder set output is fed to the input of the digital-to-analog converter associated with the existing communicating correspondents.

The invention is of use more particularly, but without limitation, for the connection network described in the applicant's French Patent Application No. 73.24841 of July 6, 1973, corresponding to the U.S. application entitled "Connection Network for a Time Switching Automatic Electronic Exchange", Ser. No. 486,080, filed July 5, 1974.

BRIEF DESCRIPTION OF THE DRAWINGS

The invention will be more clearly understood if reference is made to an embodiment of a conference circuit and to the accompanying drawings wherein.

DETAILED DESCRIPTION OF THE PREFERRED EMBODIMENT

In the examples chosen, to simplify the diagrams consideration is given to a connection network G comprising five incoming multiplex PCM lines E1 to E5 and five outgoing multiplex PCM lines S1 to S5. Each incoming line E1 to E5 comes from an analog-to-digital converter followed by a compressor in order not to overload the diagrams unnecessarily, neither such converter nor its compressor are shown.

Each line can output 32 different calls in an eight bit code and at a 125 microsecond signal sampling frequency. The connection network G can be devised in accordance with the French Patent Application previously mentioned.

Figure 1:
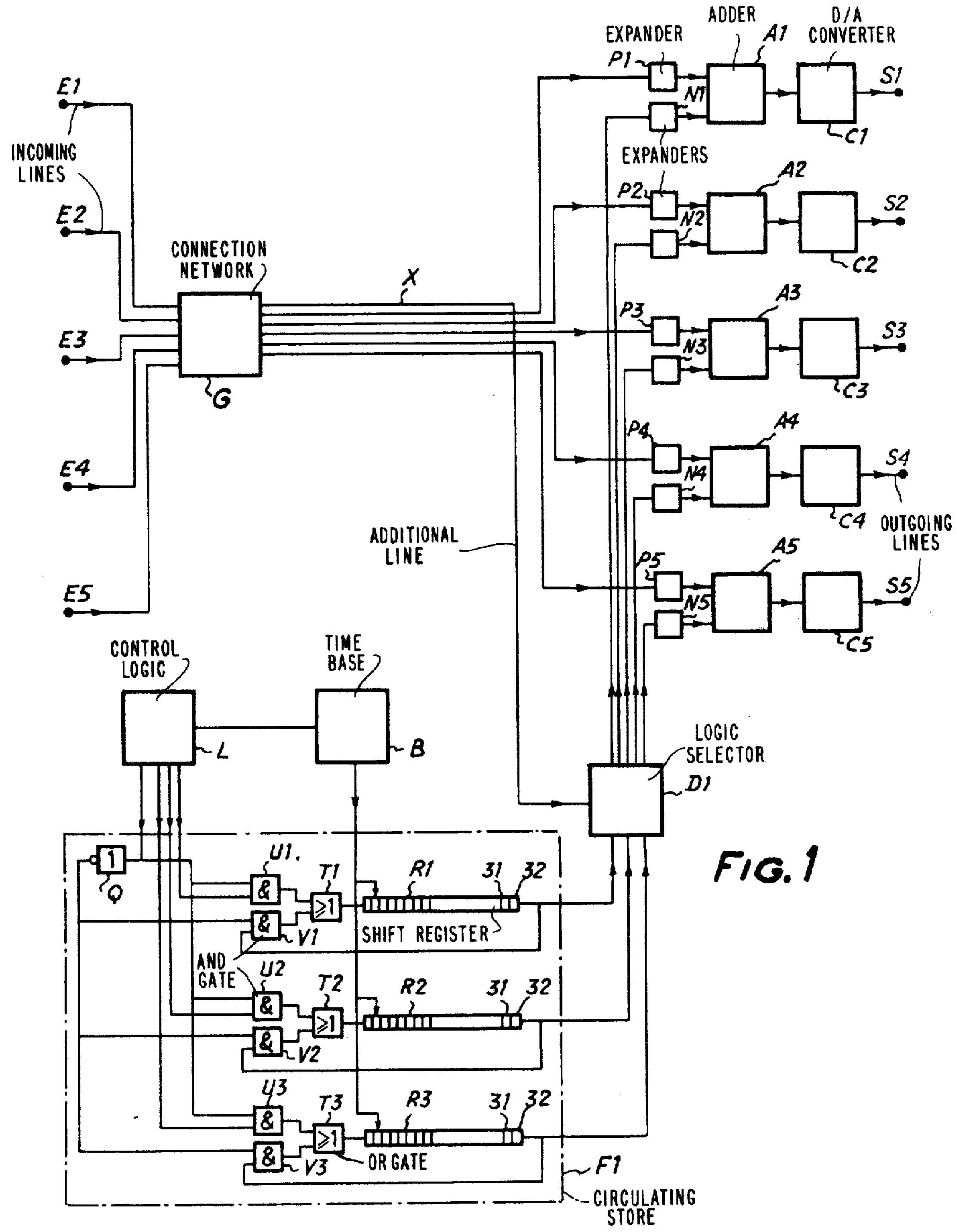
FIG. 1 is the block schematic diagram of a conference circuit between three correspondents.

In the example given in FIG. 1, network G comprises an additional PCM multiplex line X via which the digital codes for the speech of a third correspondent to be conferenced with two correspondents already talking to one another are passed.

Each outgoing multiplex PCM line extending from the network G has connected to it consecutively an expander (references P1 to P5), an adder (references A1 to A5) and a digital-to-analog converter (references C1 to C5). The adders A1 to A5 have two inputs, the first of which is connected to the output of the corresponding expander P1 to P5. The output of each adder A1 to A5 serves as the input for the corresponding digital-to-analog converter C1 to C5. The function of the adders A1 to A5 is to make it possible to introduce into the converters C1 to C5 digital codes corresponding, for each time slot of the PCM multiplex, to the sum of the digital codes for the speech of one of the first two correspondents already communicating with one another and for the speech of the third correspondent. Accordingly, the additional line X extends to routing means in the form of a logic selector circuit D1 having outputs to a number equal at most to the number of digital-to-analog converters — i.e., having five outputs in the particular example selected.

Each of the last-mentioned outputs is connected to the input of an expander (N1 to N5) whose output is connected to the second input of one of the adders A1 to A5. Circuit D1 is, for instance, a logic demultiplexer circuit routing the line X to one of the five outputs on the basis of an address code supplied by a circulating store F1 at the rate of one address for each 3.9 microsecond interval.

Since there are five outputs, three bits are necessary for such routing. Correspondingly, the circulating store F1 comprises three identical circuits each comprising a respective shift register (R1 to R3) of the series kind and having 32 positions. The shift register output is connected to the logic selector D1. The shift register input is connected to the output of an OR-gate (T1 to T3) whose two inputs are connected to the outputs of two AND-gates respectively (U1 to U3, on the one hand, and V1 to V3 on the other hand), each having two inputs. For all the three circuits of the store F1 a not-gate Q has its input connected to a control logic L, transmits to it instructions for entry into the registers R1 to R3, and to the first inputs of the gates U1 to U3; gate Q has its output connected to the first inputs of the gates V1 to V3 whose second inputs are connected to the outputs of the registers R1 to R3 respectively. Each second input of the gates U1 to U3 receive from the control logic L for each time slot the address code of the digital-to-analog converter to which the logic selector circuit D1 must route the line X. For this purpose, the control logic L must be controlled by a time base B which also supplies the shift signals to the registers R1 to R3.

For instance, if communication is proceeding between two first correspondents via the lines E4 and S3 in one direction and via the lines E3 to S4 in the other direction and a third correspondent has obtained permission via the connection E5-X in the connection network G to conference with the two communicating correspondents, the control logic gives the store F1 the address code necessary for circuit D1 to route line X to expander N3 in one of the directions and to the expander N4 in the other direction; however, the whole is so performed that, because of the control logic L and of the time base B, simultaneous time slots correspond to the speech in one direction of two of the correspondents to the third, and speech in the other direction using other time slots.

Figure 2:
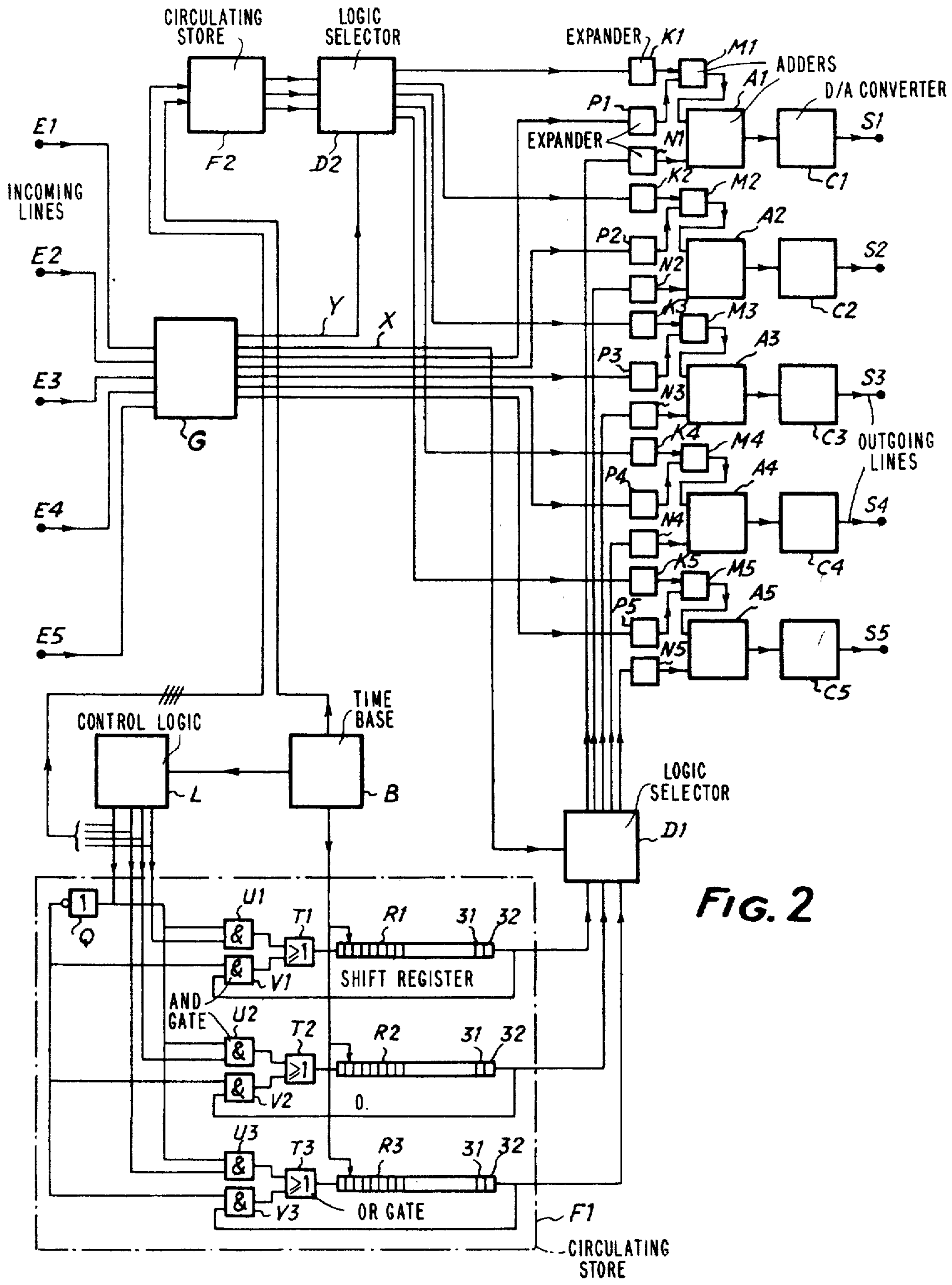
FIG. 2 is the block schematic diagram of a conference circuit between four correspondents.

FIG. 2, which is of use for a conference between four correspondents, is similar to FIG. 1 except for the addition of a second outgoing PCM multiplex line Y which, like the line X, is connected to a logic selector circuit D2; the same is identical to circuit D1 and receives from a circulating store F2, which is identical to the circulating store F1 and controlled by the same logic L and by the same time base B, the address code necessary for routing its outputs to expanders K1 to K5. However, the outputs of the expanders P1 to P5, instead of being connected to the first inputs of the adders A1 to A5 respectively, are connected to the second inputs of other adders M1 to M5 whose first inputs are connected to the outputs of the expanders K1 to K5 respectively, and whose outputs are connected to the first inputs of the adders A1 to A5 respectively.

Clearly, therefore, the conference circuit can be expanded ad infinitum by the addition of extra lines, as X and Y, associated with logic selector circuits, as D1 and D2, with stores, as F1 and F2, and with expanders, as N1 to N5 and K1 to K5, subject to extra adders being so added as to add up the digital codes of the various correspondents between the expanders and the digital-to-analog converters.

Lines such as X and Y, since they are outgoing PCM multiplex lines, can each be used for a number of simultaneous conferences using different time slots — i.e., in the particular example selected it will be possible to have 16 different three-correspondent conferences just by means of the single extra line X, and 16 different four-correspondent conferences by using the lines X and Y simultaneously.

The invention is of use for any number of incoming and outgoing lines.

Its main use is for electronic telephone exchanges.

I claim:

1. Apparatus for forming a conference connection to connect an additional party to an existing multiple party connection in an automatic electronic multiplex pulse code modulation (PCM) exchange comprising:

a plurality of incoming PCM lines, a plurality of outgoing PCM lines equal in number to the number of said plurality of incoming lines, each outgoing PCM line providing outgoing PCM signals, exchange connection means having input and output means for interconnecting said incoming and outgoing lines, a plurality of expander circuit means, one expander circuit means connected between the output means of said exchange connection means and each outgoing PCM line, an additional PCM line for each additional party providing PCM signals, said additional line connected between the output means of said exchange connection means and to routing means, said routing means providing additional party PCM signals in the same time slot as the existing multiple party connection, additional expander means for each additional party, said expander means connected to said routing means for providing expanded additional party PCM signals, and means for adding said expanded additional party PCM signals to said outgoing PCM signals in said existing multiple party connection.

2. Apparatus as recited in claim 1 further comprising digital-to-analog converter means connected between said adding means and said outgoing PCM lines.

3. Apparatus as recited in claim 1 wherein said routing means comprises:

a logic selector circuit for interconnecting said additional PCM lines to any one of said additional expander means in accordance with received address code signals, circulating storage means for providing said address code signals to said logic selection circuit, control logic means providing input address codes to said circulating storage means, and clock means for synchronizing said control logic means and said circulating storage means.

4. Apparatus as recited in claim 3 wherein said circulating storage means comprises a plurality of shift registers, each shift register having as many stages as time slots in the PCM multiplex.

5. Apparatus as recited in claim 4 wherein the number of shift registers is equal to n where the number of outgoing PCM lines is less than or equal to $2^n$.

6. A method of forming a conference connection to connect an additional party to an existing multiple party connection in an automatic multiplex pulse code modulation (PCM) exchange comprising the steps of:

providing expander circuits for each outgoing PCM line for providing outgoing PCM signals, providing an additional outgoing PCM line for carrying PCM signals of said additional party, feeding said additional party PCM signals to an additional expander circuit for providing expanded additional party PCM signals, and adding said expanded additional party PCM signals to said outgoing PCM signals to provide conference PCM signals.

7. A method as recited in claim 6 further comprising the step of feeding said conference PCM signals to digital-to-analog converters.

8. A method as recited in claim 6 wherein said feeding step comprises:

supplying an address code identifying said outgoing line to selection means, and synchronizing said address codes to route said additional party PCM signals into the same multiplex time slot as the existing party connection time slots.

* * * * *